US012325086B2

(12) United States Patent
Conseil et al.

(10) Patent No.: US 12,325,086 B2
(45) Date of Patent: Jun. 10, 2025

(54) LASER ABLATION METHOD FOR ENGRAVING A WORKPIECE WITH A TEXTURE

(71) Applicant: GF Machining Solutions SA, Meyrin (CH)

(72) Inventors: David Conseil, Collonges-sous-Salève (FR); Charles Eric Laporte, Clamart (FR)

(73) Assignee: GF Machining Solutions SA, Meyrin (CH)

( * ) Notice: Subject to any disclaimer, the term of this patent is extended or adjusted under 35 U.S.C. 154(b) by 837 days.

(21) Appl. No.: 17/527,758

(22) Filed: Nov. 16, 2021

(65) Prior Publication Data

US 2022/0152739 A1 May 19, 2022

(30) Foreign Application Priority Data

Nov. 18, 2020 (EP) ..................................... 20208258

(51) Int. Cl.
*B23K 26/352* (2014.01)
*B23K 26/06* (2014.01)
*B23K 26/362* (2014.01)

(52) U.S. Cl.
CPC ........ *B23K 26/355* (2018.08); *B23K 26/0665* (2013.01); *B23K 26/362* (2013.01)

(58) Field of Classification Search
CPC ........................... B23K 26/064; B23K 26/082; B23K 26/0884; B23K 26/0643; B23K 26/362; B23K 26/0665; B23K 26/355
See application file for complete search history.

(56) References Cited

U.S. PATENT DOCUMENTS

| 10,898,973 B2* | 1/2021 | Lewicki ............... B23K 26/083 |
| 2002/0043522 A1* | 4/2002 | Aberle .................. B23K 26/08 219/121.69 |

(Continued)

FOREIGN PATENT DOCUMENTS

| EP | 3072627 A1 | 9/2016 |
| KR | 10-1511325 B1 | 4/2015 |

OTHER PUBLICATIONS

Extended European Search Report for corresponding Application No. 20208258.2 dated May 14, 2021 (8 Pages).

*Primary Examiner* — Brian W Jennison
(74) *Attorney, Agent, or Firm* — Harness, Dickey & Pierce, P.L.C.

(57) ABSTRACT

A laser ablation method for engraving a workpiece with a texture by a laser beam emitted by a laser head integrated in a machine tool comprising:
  a. generating a plurality of machining layers based on the geometry of the workpiece to be machined in succession;
  b. generating for each machining layer a plurality of patches, each of which defines an area which is to be machined from a single position of the laser head, wherein a first patch and a second patch are positioned adjacent having a common border defined as a patch junction, wherein at least one of the patch includes an non-ablation area and an ablation area based on the texture to be engraved, and the ablation area includes a plurality of laser vectors having two ends defining the path of the laser beam to remove the material of the ablation area, wherein at least one laser vector in the first patch and at least one laser vector in the second patch having a common end at the patch junction are defined as intersected laser vectors and the position of the common end is defined as an intersection position; and (Continued)

c. reducing the number of intersected laser vectors by eliminating at least one intersection position.

10 Claims, 6 Drawing Sheets

(56) References Cited

U.S. PATENT DOCUMENTS

| | | | |
|---|---|---|---|
| 2013/0337238 A1* | 12/2013 | Costin, Jr. | B23K 26/082 |
| | | | 425/150 |
| 2016/0207141 A1* | 7/2016 | Conseil | B23K 26/359 |
| 2019/0001436 A1* | 1/2019 | Conseil | B23K 26/082 |
| 2019/0358744 A1* | 11/2019 | Hildebrand | G05B 19/19 |
| 2020/0038996 A1* | 2/2020 | Hofinger | B23K 26/352 |

* cited by examiner

LASER ABLATION METHOD FOR ENGRAVING A WORKPIECE WITH A TEXTURE

CROSS-REFERENCE TO RELATED APPLICATIONS

This application is claiming priority to European Patent Application 20208258.2 filed Nov. 18, 2020 all of which is incorporated by reference in its entirety.

FIELD OF THE INVENTION

The present invention is related to a laser ablation method for engraving a workpiece with a texture by a laser beam emitted by a laser head integrated in a machine tool. In further, the present invention is related to a machine tool for engraving a workpiece with a texture.

BACKGROUND OF THE INVENTION

The laser ablation method and the machine tools for machining parts by laser texturing are generally known. The patent applications EP 2 301 706 describes an example of a laser texturing machine. However, the traditional ablation method often generates defects such as visible markings on the machined part, which has a negative impact on the quality of produced parts.

Various methods for reducing such defects have been proposed. The document EP 3 047932 discloses a method that makes it possible to reduce the visible markings, while reducing the machine time. This method describes defining the laser path in a special way to avoid such visible markings. But, it is not always possible to define the laser path in this manner. It depends on the texture and the shape of the workpiece. For example, the proposed method is not suitable for ablating a large continues area.

U.S. Pat. No. 6,518,544 discloses a laser ablation method to improve the quality of the engraved part. In this method, a laser beam is led in tracks over a section of a surface to be machined, whereupon the surface is moved in order to bring a neighbouring section into the machining field of the laser over which the laser beam is then again led in tracks. At the borders of neighboring sections there is formed an overlapping region, whose machining is allocated to the one or the other section such that the tracks in which the laser beam is guided on the respective section intermesh in the overlapping region. This method can improve the engraving quality but still generate visible marks at the border of the neighbouring sections.

SUMMARY OF THE INVENTION

It is an objective of this invention to provide a laser ablation method to overcome the drawbacks of the known method. It is an objective of this invention to further improve the quality of the engraved part. In particular, it is an objective of the invention to provide a laser ablation method to minimize the visible markings on the produced part.

According to the present invention, these objectives are achieved through the features of independent claims. In addition, further advantageous embodiments follow from the dependent claims and the description.

In the present invention, a laser ablation method for engraving a workpiece with a texture by a laser beam emitted by a laser head integrated in a machine tool comprises: generating a plurality of machining layers based on the geometry of the workpiece to be machined in succession; generating for each machining layer a plurality of patches, each of which defines an area which is to be machined from a single position of the laser head, wherein a first patch and a neighboring patch are positioned adjacent having a common border defined as a patch junction, wherein at least one of the patches includes a non-ablation area and an ablation area based on the texture to be engraved, and the ablation area includes a plurality of laser vectors having two ends defining the path of the laser beam to remove the material of the ablation area, wherein at least one laser vector in the first patch and at least one laser vector in the neighboring patch having a common end at the patch junction are defined as intersected laser vectors and the position of the common end is defined as an intersection position; and reducing the number of intersected laser vectors by eliminating at least one intersection position.

The machining layers are generated based on the geometry of the workpiece and the texture to be machined in succession. For each machining layer, a plurality of patches are generated, in particular in consideration of the texture to be ablated. Each of the patch is to be machined from a single position of the laser head. In further, a first patch and a neighboring patch having a common portion of the border defined as a patch junction. At least one of the patches includes a non-ablation area and an ablation area, which includes a plurality of laser vectors defining the path of the laser beam to remove the material. Each laser vector has two ends. At least one laser vector in the first patch and another laser vector in the neighboring patch having a common end at the patch junction and these two laser vectors are defined as intersected laser vectors and the position of the common end at the patch junction is defined as an intersection position.

The machining layer specifies a defined thickness of the material, a patch specifies an area of one layer to be ablated by one laser head position.

The laser ablation techniques is used for the texturing work by sublimation of the material, generally metal, on the surface of a workpiece. The machining is performed over several steps, each step corresponding to the machining of a layer of the part. In effect, on each laser beam pass, the material can be sublimated only for a depth of approximately 1 to 5 micrometres. Because of this, the number of machining layers to texture a surface commonly lies between 20 and 100.

The part can be modelled numerically by a meshing of usually triangles to generate a 3-D modelling file, e.g. a mesh file. The principles implemented to apply a texture to a 3-dimensional surface are widely known. The texture patterns have to be applied by laser ablation to the surface of the workpiece are typically defined by a grey-scale image called texture file. The image represents a set of sublimation points in which the grey level of each point defines the ablation depth that has to be obtained at this particular point: the lighter a point is, the less ablation there will be, and the darker the point is, the deeper the ablation will be. The number of different grey levels can possibly equal the number of machining layers, but not necessarily. In effect, the texture images are defined by grey levels coded on eight or even sixteen bits, whereas the number of machining layers, as already indicated, most often lies between 20 and 100. From the 3D modelling file and the grey level texture file, a set of machining layers is therefore usually computed. Each machining layer has a corresponding black and white image: if a point is white, there is no ablation, and if it is black, there will be ablation by sublimation.

For each machining layer, it is necessary to compute a set of positions of the laser head making it possible to machine the areas of this layer. Usually, the optical systems used for the laser ablation with a focal length e.g. of 430 millimetres make it possible, from a given position of the laser head, to machine a planar surface measuring e.g. 300×300 millimetres, called marking field. The dimension of the marking field is limited due to the optical systems of the machine tool. It means that the area being machined at a given position of laser head is limited, thus, each machining layer must be divided into a plurality of patches and each of patch can be machined from a given position of the laser head. In order to machine another patch, the machine head must be repositioned. Each patch can comprise a large number of 3D modelling meshing triangles. The set of the 3D modelling meshing triangles that can be machined from a given position of the laser head, in particular from one single position is called patch. Usually, each patch has a borderline to define the area of this patch. Since each patch includes a set of meshing triangles, the borderline of the patch run along the edges of the triangles.

A complete texturing machining of the surface of a workpiece therefore consists in ablating a plurality of machining layers, with, for each layer, a set of positions that the machining head must reach, so as to machine a patch for each position for the layer concerned. Naturally, the computation of the laser head positions and of the patches machined requires enormous computer resources: several hours or even several days depending on the complexity and on the dimensions of the part, on the type of algorithm used, on the number of machining layers, etc. This computation is therefore generally performed on a specific workstation or computer, only the result of the computation then being transmitted to machine tool used for laser ablation. The result of the computation essentially consists of a machining toolpath, which comprises a succession of positions that the laser machining head must occupy in relation to the part, and, for each position, a succession of ablation operations corresponding to the scanning that the laser beam must perform from this position. This result directly influences both the machining time and the finishing quality of the texturing.

However, the traditional ablation method often generates defects at the boundary of the adjacent patches, in the form of boundary lines that are visible.

For processing the workpiece surface, the laser beam always moves along the predefined parallel laser vectors. To produce a texture respectively a relief on the surface, the laser pulses are switched off whenever the sublimation of material is not requested. This is the known and commonly used method for the laser texturing a predefined patch on a workpiece, so called vector-like working process. Thus, the area to be ablated within a patch is defined by a plurality of laser vectors and each laser vector has two ends to define the start position of the laser vector and the end position of the laser vector.

If it is possible, the patch is defined in a way that the borderline of the patch go through the area, which must not be ablated. However, it is not always possible to define the patch in this way. Thus, in most of patches, at least of a part of the borderline goes through the area of the patch, which must be ablated, this means, one or more laser vectors start or end at the borderline of the patch. Two neighbouring patches have the patch junction, which is the common part of the borderlines of these two patches. If two laser vectors in these two neighbouring patches have a common end at the patch junction defined as intersection position, a visible marking can be seen at the intersection position. Thus, in order to reduce the visible markings to enhance the quality of the machined part, the number of intersected laser vectors are reduced by eliminating at least one intersection position. In particular, a significant improvement of the surface quality can be achieved, if the most of intersection positions can be removed. The intersection position can be eliminated by redefining the position of the ends of the intersected laser vectors.

In one preferred variant, the common end of the intersected laser vectors at the intersection position is extended along one of the intersected laser vectors to reach an adapted end position, which is in a non-ablation area of the patch. Since the adapted end position is in the non-ablation area, the visible marking can be reduced significantly.

In one variant, a first laser vector in the first patch and another laser vector in the neighboring patch are the intersected laser vectors having a common end at the intersection position. In order to eliminate the intersection position, the end of the first laser vector at the intersection position is extended along the another laser vector to reach a first adapted end position, which is in a non-ablation area of the second patch. When the first adapted end position is selected, the another laser vector is vanished, because the first laser vector having the first adapted end position covers the length of the another laser vector. Even one end of the first laser vector, namely the first adapted end position is arranged in the neighboring patch, the first laser vector belongs to the first patch. This means, the entire first laser vector including the part in the neighboring patch is machined by the same laser head position, which is applied for all the laser vectors of the first patch.

In another variant, the end of the another laser vector at the intersection position is extended along the first laser vector to reach a second adapted end position, which is in a non-ablation area of the first patch. In this case, the first laser vector is vanished, since the length of the first laser vector is replaced by the another laser vector. Even one end of the another laser vector, namely the second adapted end position is arranged in the first patch, the another laser vector belongs to the neighboring patch. This means, the entire another laser vector including the part in the first patch is machined by the same laser head position, which is applied for all the laser vectors of the second patch.

After adapting the end position of the laser vectors from the intersection position to the first adapted end position or the second adapted end position, the ablation at the intersection position occurs only once instead of twice, thus the visible marking at this position is reduced. Moreover, since the first adapted end position or the second adapted end position is in a non-ablation area, the surface quality can be further improved.

Depending on the textures, both mentioned variants are possible. In order to improve the machining sufficiency, the distance from the intersection position to the first adapted end position and the distance from the intersection position to the second adapted position are compared and the adapted end position having the smaller distance is selected. If the distance from the intersection position to the first adapted end position is smaller than the distance from the intersection position to the second adapted end position, then the intersection position is moved to the first adapted position by extending the another laser vector into the first patch. If the distance from the intersection position to the second adapted end position is smaller than the distance from the intersection position to the first adapted end position, then the intersection position is moved to the second adapted position by extending the first laser vector into the neighboring patch.

In a preferred variant to ensure that the ablation area in each patch can be machined from one single position of the laser head without compromising the ablation quality, at least one margin for each side of the patch junction is predetermined to define a patch junction region, in which the adapted end position can be positioned. As outlined above, the marking field is limited, thus, the maximal area, which can be machined by the laser head at one single position is limited. Therefore, the extension of the intersected laser vector into the neighboring patch must be limited in a defined range to ensure that it can still be machined by the laser head without changing its position. For example, if the first laser vector is extended into the second adapted end position in the neighboring patch, the second adapted end position must be within the defined patch junction region. If the second adapted end position lies out of this region, a portion of the extended first laser vector in the neighboring patch cannot be ablated by the machine head staying at the position where the first patch is ablated. Thus, the first adapted position and the second adapted end position are positioned in the patch junction region. In one variant, a first margin is set for the first patch and a second margin is set to the neighboring patch. It is also possible to set a plurality of margins in each patch.

As disclosed in EP 3 421 168 validation can be applied to further improve the quality of the machined part.

In a preferred variant, the first margin and the second margin are equal.

If two adjacent laser vectors in one patch are intersected two adjacent laser vectors in the neighboring patch, two adjacent intersection positions are present, it is preferably to extend the laser vectors in the same direction such that both adapted end position lie in the same patch. Thus, in one variant, the two neighbored intersection positions are moved to the two adapted end positions, which are positioned in the same patch. For example, a third laser vector and a fourth laser vector belong to the first patch and the neighboring patch, respectively. The third laser vector is adjacent to the first laser vector in the first patch and the fourth laser vector is adjacent to the another laser vector in the neighboring patch. The first laser vector and the another laser vector are intersected at a first intersection position at the patch junction of the first patch and the neighboring patch, whereas the third laser vector and the fourth laser vector are intersected at a second intersection position at the same patch junction. Obviously, the first intersection position and the second intersection position are adjacent. If the first intersection position and the second intersection position are moved into different patches, visible marking can be seen caused by the thermal effect and the overlapping of the focus point of the laser beam. In order to avoid this marking, the first intersection position and the second intersection position are preferably moved into the same patch, either into the first patch or into the neighboring patch.

It is also possible to change a laser vector in the first patch adjacent to one intersected laser vectors to the neighboring patch.

In the present invention, a control unit for controlling a laser beam emitted by a laser head integrated in a machine tool for engraving a workpiece with a texture is configured to receive control data generated on the basis of the ablation method, in particular the control data is generated in an external device.

In the present invention, a machine tool for engraving a workpiece with a texture by a laser beam emitted by a laser head integrated in the machine tool comprises a control unit.

BRIEF DESCRIPTION OF THE DRAWINGS

A more particular description of the principles briefly described above will be rendered in the following by reference to specific embodiments thereof, which are illustrated in the drawings. These drawings illustrate exemplary embodiments of the disclosure and are not therefore to be considered to limit its scope. The principles of the disclosure are described and explained with details through the use of the accompanying drawings in which:

FIG. 3: illustrates one example of 3-D modeling file;
FIG. 4: illustrates a textural image file
FIG. 5; illustrate patches.

EXEMPLARY EMBODIMENTS

Figure 1:
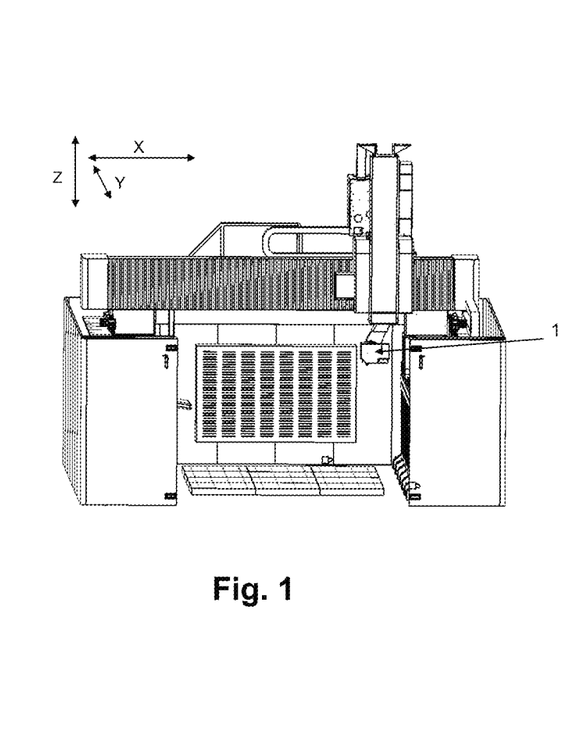
FIG. 1: Illustrates a machine tool for laser ablation.

FIG. 1 schematically represents an example of construction of machine tool for laser texturing. The laser head 1 of the machine and the part are positioned in relation to one another according to 5 mechanical axes, which makes it possible to orient the direction of the laser beam emitted and to position the focal point of the laser on the surface of a machined part, not represented, placed in the machine. The laser head 1 may be displaced in the three dimensions X, Y and Z of a Cartesian reference frame. Advantageously, the laser head is also mobile in rotation about rotation axes, not represented to obtain a greater accuracy and a greater flexibility. In the rest of the disclosure, it will be considered that, for all the examples given, it is the laser head, which is mobile according to five axes, namely three axes in translation and two axes in rotation. The laser head comprises a laser source for emitting laser beam, optical devices, and a galvanometer.

Figure 2:
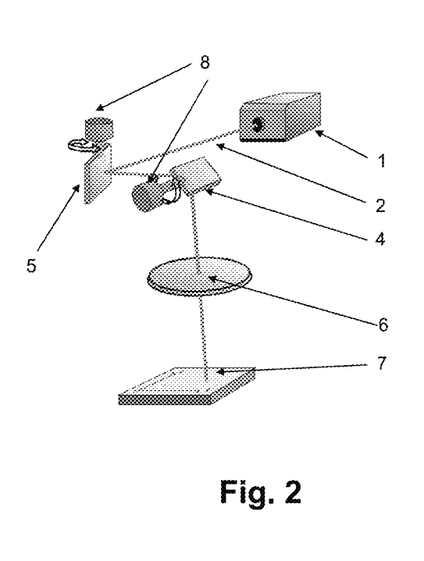
FIG. 2: Illustrates a machine tool for laser ablation.

FIG. 2 schematically illustrates the operation of the galvanometer. The laser head 1 emits a laser beam 2, or more specifically a pulsed laser beam. The laser beam 2 is reflected by mirrors 4 and 5, which respectively make it possible to define, according to the axes X and Y of the Cartesian reference frame, the position of the point of projection of the laser beam on the surface of the part 7. Actuators 8 make it possible to control the angular position of the mirrors 4 and 5. The laser beam also passes through a lens 6 with a dynamic focusing correction, commonly called F-theta lens. This device thus makes it possible to define the point of impact of the laser beam with the surface of the part 7 in a plane situated in the focal range considered.

Usually, the systems used with a focal length of for example 430 millimetres make it possible, from a given position of the laser head 1, to machine, using the galvanometer, a planar surface measuring 300×300 millimetres, called marking field. On the other hand, when the surface of the part 7 to be machined is not planar, the focusing capacity of the lenses limits the marking field in the directions X and Y. If the curvature of the part is significant, it is then necessary to reduce the dimensions on X and Y of the marking fields for the variation on Z in each marking field. Naturally, this consequently increases the number of different positions occupied by the laser head to carry out a texturing job, namely the number of patches generated must be increased. This is why optical devices for zooming on the axis Z have been developed, which make it possible to vary the focusing along the axis Z, and allow the machining of marking fields with marking depths of + or −80 millimetres. The use of a focus varying device does not eliminate the relative repositioning of the laser head 1 and of the part, but it does substantially limit the number thereof.

Figures 3, 4, 5:
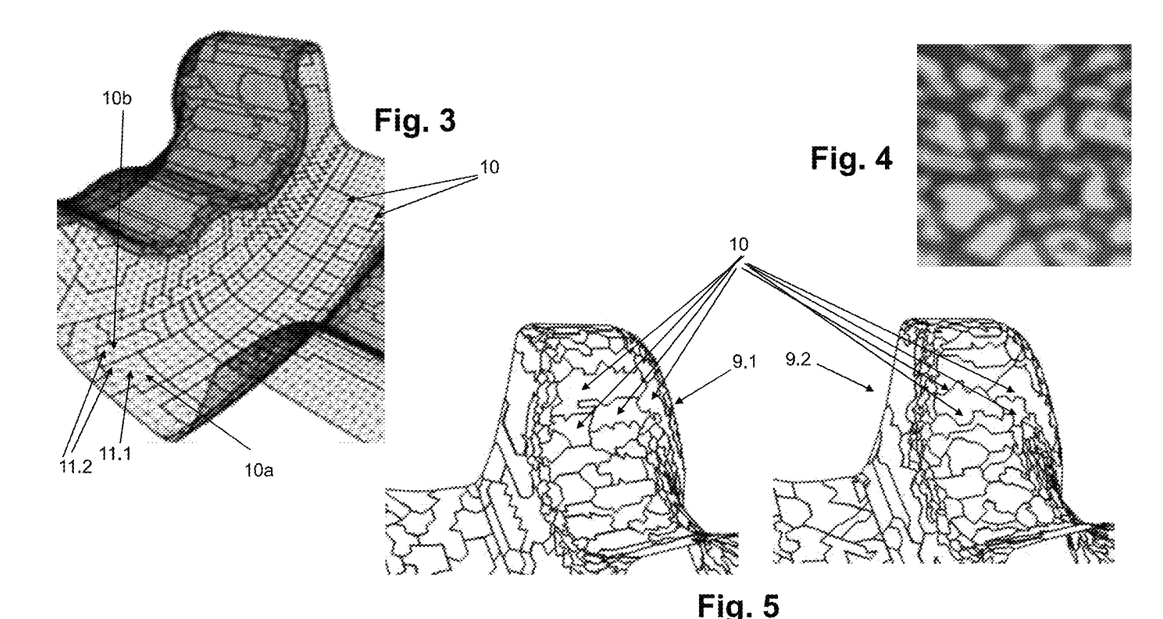

FIG. 3 illustrates one example of modelling 3-dimensional forms of the part numerically by a meshing of usually triangular forms 11.1, 11.2 and the patches 10, 10a, 10b. The thick black lines present the borderlines of different patches. Each patch consists of a plurality of mesh triangles presented by the thinner black lines. The borderline of patches run along the edge of mesh triangles. Some mesh triangles are positioned at the patch junction such as the mesh triangle numbered as 11.2, some mesh tringles are not at the patch junctions, such as the mesh triangle numbered as 11.1. It is also possible that the patch includes only mesh triangles, which are positioned at the patch junction such as the patch numbered as 10b.

FIG. 4 illustrates one example of the textures which have to be applied by laser ablation to the surface of the part are typically defined by a grey-scale image. The image represents a set of sublimation points in which the grey level of each point defines the ablation depth that has to be obtained at this particular point: the lighter a point is, the less ablation there will be, and the darker the point is, the deeper the ablation will be.

As schematically represented in FIG. 5, it is commonplace to define, for two successive layers 9.1 and 9.2, patches 10, which are not superimposed.

Figure 6:
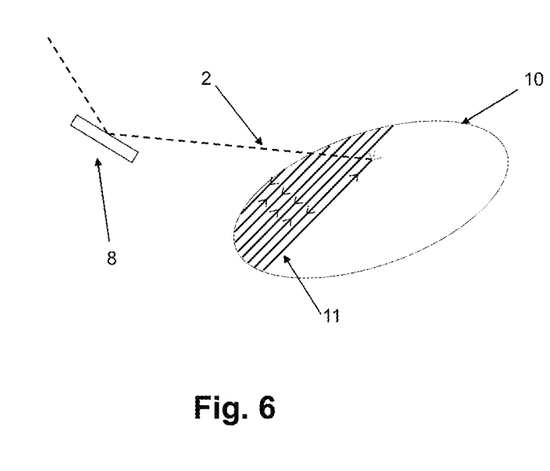
FIG. 6: illustrate patches.

For processing the workpiece surface, the laser beam always moves along the predefined parallels laser vectors on the displayed patch 10 of FIG. 6, jumping at the border of the patch 10 to the next position. The FIG. 6 shows an example that the whole area of the patch must be ablated.

Figure 7:
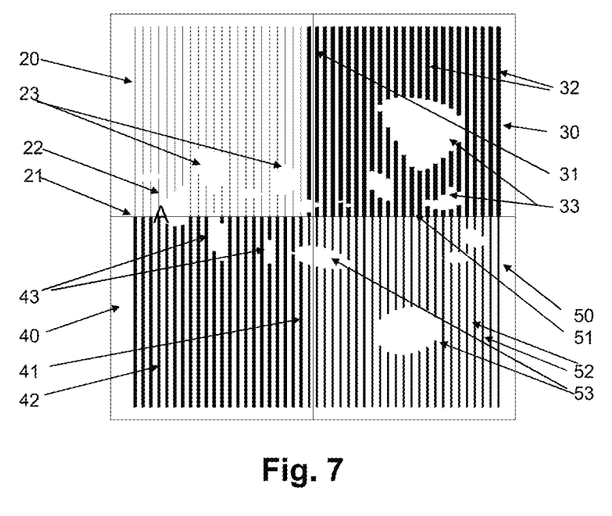
FIG. 7: illustrate patches.

The patches shown in the figures having rectangular shape are simplified illustration. The patches can have different shapes. The shapes of the patches and the number of the patches are not limited to the particular shapes and numbers shown in the figures. FIG. 7 shows four patches, the first patch 20, the second patch 30, the third patch 40 and the fourth patch 50. The border between the first patch and the third patch form the first patch junction 21, the border between the first patch and the second patch forms the second patch junction 31, the border between the third patch and the fourth patch forms the third patch junction 41 and the border between the second patch and the fourth patch forms the fourth patch junction 51. The vertical lines having different thicknesses symbolize the laser vectors of the first patch 22, the laser vectors of the second patch 32, the laser vectors of the third patch 42 and the laser vectors of the fourth patch 52. All the area covered by the laser vectors are the ablation area, namely the material of these areas must be ablated. The white areas are the non-ablation areas 23, 33, 43 and 53 in different patches, namely no materials must be ablated in these areas. In the FIGS. 7 to 12, the laser vectors are illustrated in vertical direction and the patch junctions are illustrated as straight border vertically or in parallel to the laser vectors. These illustrations are only simplified presentations. In the present invention, the patch junctions are not limited to the presentations in the figures.

Visible markings can be generated at the patch junctions. When the patch junction is in parallel to the laser vectors, the marking is weak. However, when two laser vectors in two adjacent patches have the same start or end position at the patch junction of these two patches, for example the laser vector 22 of the first patch 20 is intersected with the laser vector 42 of the third patch 30 at the point A on the first patch junction 21. Such laser vectors are defined as intersected laser vectors and the common position at the patch junction is defined as an intersection position for example point A.

Figure 8:
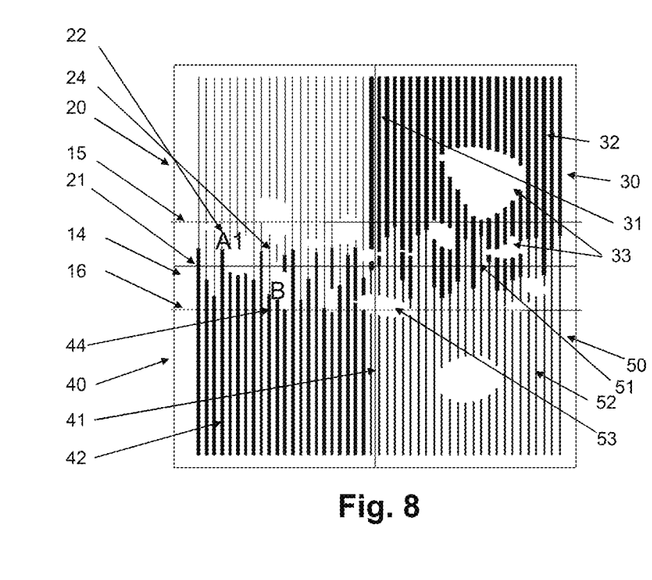
FIG. 8: illustrates one example of prior art.

In order to reduce the visible marking at the junctions, a so-called random patch method is applied as shown in FIG. 8. The intersection position of the intersected laser vectors are moved randomly to a new position, which is not at the patch junction. For example, the intersection position at the point A is moved to the point A1, which is not on the patch junction 21 but in the first patch 20. However, the laser vector 42 still belongs to the third patch, this means, the laser vector 42 symbolized by the thick line is machined with the laser head position for the third patch, even the part arranged in the first patch. In order to ensure the ablation after moving the intersection position, at least one margin to limit the range of reposition is defined. In this example, two margins are illustrated as two straight lines 15 and 16 parallel to patch junctions to define a patch junction region 14. However, this illustration is simplified and the margins are not limited to be straight lines and parallel to the patch junction.

Figure 9:
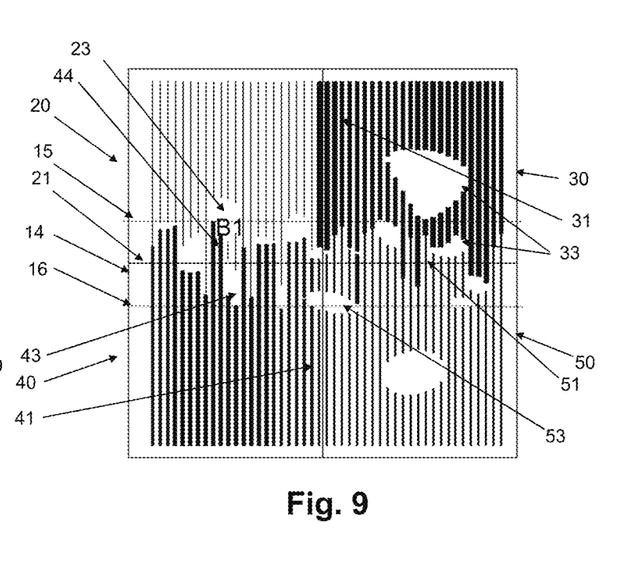
FIG. 9: illustrate the embodiments of the present invention.

One embodiment of the present invention is illustrated in FIG. 9. The intersection position of the intersected laser vector is moved away from the patch junction and, a non-ablation area symbolized by white area is searched in order to move the intersection position from the patch junction to the border of the non-ablation area, if it is possible. For example, the laser vectors 24 and 44 are intersected laser vectors. In the standard random method shown in FIG. 8, the intersection position is moved to the point B in the third patch. In the present invention, the non-ablation area 23 is found along the laser vectors 24 and 44, therefore, the intersection point B1 is moved to the border of this non-ablation area. Consequently, the laser vector 44 of the third patch is extended to this new intersection position B1 and the laser vector 24 of the first patch is removed.

Figures 10, 11:
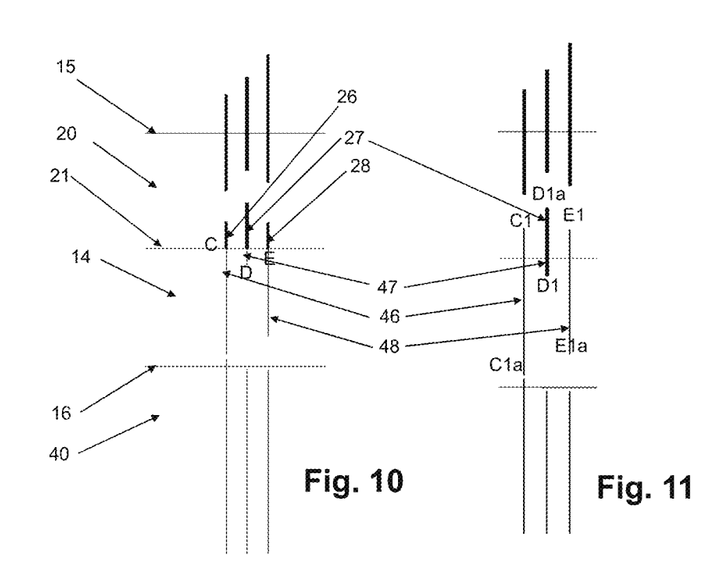
FIG. 10: illustrate the embodiments of the present invention.
FIG. 11: illustrate the embodiments of the present invention.

FIGS. 10 and 11 illustrate another embodiment of the present invention. The first laser vectors 26, the second laser vector 27 and the third laser vector 28 of the first patch are adjacent laser vectors and end at the first junction 21, and the fourth laser vector 46, fifth laser vector 47 and the sixth laser vector 48 in the third patch 40 are also adjacent laser vectors and end at the same patch junction 21 at the intersection points C, D and E, because the first patch and the third patch are neighbouring patches. In the situation illustrated in the FIG. 10, several options are available to change the positions of the intersection positions. One variant is based on the smallest distance, namely to move the laser vectors to the smallest distance. For example, to extend the fourth laser vector 46 of the third patch into the first patch to the point C1 instead of extending the first laser vector 26 into the third patch to the point C1a. The second laser vector 27 is extended into the third patch to the point D1 instead of extending the fifth laser vector 47 into the first patch to the point D1a. The sixth laser vector 48 of the third patch is extended into the first patch to the point E1 instead of extending the third laser vector 28 into the third patch to the point E1a. However, this causes a so-called interlacing effect, which means markings are caused by the thermal effect and the overlapping of the laser beam focus point. Since the fourth laser vectors 46 and the fifth laser vector still belong to the third patch and the second laser vector 27 belongs to the first patch, therefore the ablation of the first patch is conducted before the ablation of the third patch, therefore the order of the three neighboured laser vectors 46, 47 and 48 are not ablated in this order. This causes further marking on the produced part.

Figure 12:
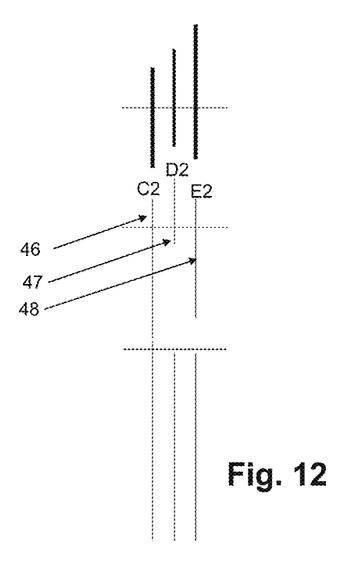
FIG. 12: illustrate the embodiments of the present invention.

In order to further improve the quality of the produced part, a so-called preferential direction is determined and applied. As shown in FIG. 12, the fourth, fifth and sixth laser vectors in the third patch are extended into the first patch. This means, the direction to extending the laser vectors are identical. The new intersection position are at the points C2, D2 and E2 of these three laser vectors are in the first patch. By this way, the interlacing between laser vectors of different patches can be avoided.

Figure 13:
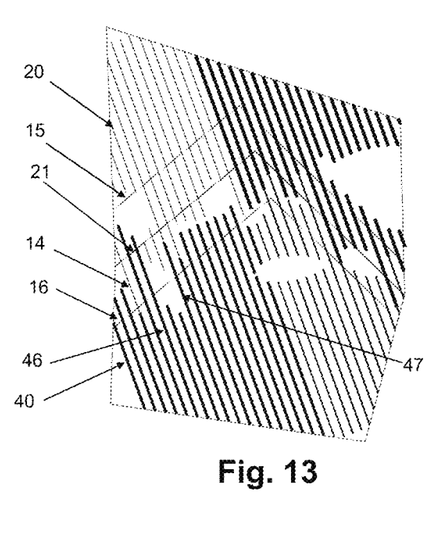
FIG. 13: illustrate the embodiments of the present invention.

FIG. 13 shows an example, in which the laser vectors are not perpendicular to the laser vectors.

Figure 14A:
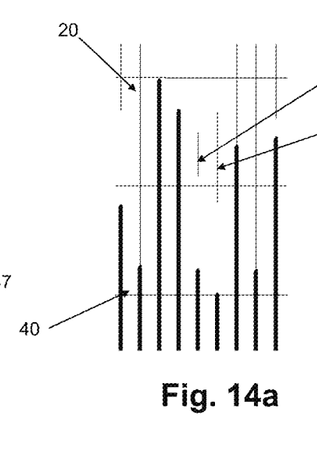
FIG. 14*a*: illustrate the embodiments of the present invention.
Figure 14B:
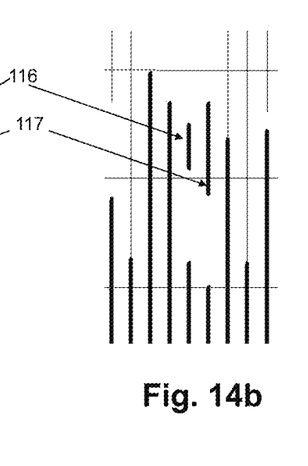
FIG. 14*b*: illustrate the embodiments of the present invention.

FIG. 14a shows a further optimization to reduce the interlacing effect. The laser vector 116 is not an intersected laser vector and belongs to the first patch, but this laser vector will be changed to the third patch as shown in FIG. 14b. The laser vector 117 is an intersected laser vector and will be optimized by also changing it to the third patch to reduce the interlacing effect.

LIST OF REFERENCES 1 laser head
2 laser beam
4, 5 mirrors
6 lens
7 part
8 actuators
9.1, 9.2 machining layers
10, 10a, 10b patch
11.1, 11.2 mesh triangle
20 first patch
21 first patch junction
22 laser vector of the first patch
30 second patch
31 second patch junction
32 laser vector of the second patch
40 third patch
41 third patch junction
42 laser vector of the third patch
50 fourth patch
51 fourth patch junction
52 laser vector of the fourth patch

What is claimed is:

1. A laser ablation method for engraving a workpiece with a texture by a laser beam emitted by a laser head integrated in a machine tool comprising:
   generating, with the machine tool, a plurality of machining layers based on the geometry of the workpiece to be machined in succession;
   generating, with the machine tool, for each machining layer a plurality of patches, each of which defines an area which is to be machined from a single position of the laser head, wherein a first patch and its neighboring patch are positioned adjacent having a common border defined as a patch junction, wherein at least one of the patches includes a non-ablation area and an ablation area based on the texture to be engraved, and the ablation area includes a plurality of laser vectors having two ends defining the path of the laser beam to remove the material of the ablation area, wherein at least one laser vector in the first patch and at least one laser vector in the neighboring patch having a common end at the patch junction are defined as intersected laser vectors and the position of the common end is defined as an intersection position; and
   reducing the number of intersected laser vectors by eliminating at least one intersection position using the machine tool;
   wherein the common end of the intersected laser vectors at the intersection position is extended along one of the intersected laser vectors to reach an adapted end position, which is in a non-ablation area of the patch.

2. The method according to claim 1, wherein a first laser vector in the first patch and an another laser vector in the neighboring patch are intersected laser vectors and the end of the first laser vector at the intersection position can be extended along the another laser vector to reach a first adapted end position, which is in a non-ablation area of the neighboring patch, or the end of the another laser vector at the intersection position can be extended along the first laser vector to reach a second adapted end position, which is in a non-ablation area of the first patch.

3. The method according to claim 2, wherein the distance between the first adapted end position to the intersection position is compared with the distance to the second adapted end position and the adapted end position having the smaller distance is selected.

4. The method according to one of claim 2, wherein when the first adapted end position is selected, the another laser vector is vanished and when the second adapted end position is selected, the first laser vector is vanished.

5. The method according to one of claim 2, wherein the first laser vector having the first adapted end position belongs to the first patch and the another laser vector having the second adapted end position belongs to the neighboring patch.

6. The laser ablation method according to one of claim 1, wherein at least one margin for each side of the patch junction is predetermined to set a patch junction region, in which the adapted end position can be positioned, in particular a first margin is set for the first patch and a second margin is set for the neighboring patch.

7. The laser ablation method according to one of claim 1, wherein the two neighbored intersection positions are moved to the two adapted end positions, which are positioned in the same patch.

8. The laser ablation method according to one of claim 1, wherein a laser vector in the first patch adjacent to one intersected laser vectors is changed to the neighboring patch.

9. A control unit for controlling a laser beam emitted by a laser head integrated in a machine tool for engraving a workpiece with a texture, wherein the control unit is configured to receive control data generated on the basis of the ablation method according to one of claim 1, in particular the control data is generated in an external device.

10. Machine tool for engraving a workpiece with a texture by a laser beam emitted by a laser head integrated in the machine tool comprising a control unit according to claim 9.

\* \* \* \* \*